United States Patent
Yamaguchi

(10) Patent No.: US 10,288,826 B2
(45) Date of Patent: May 14, 2019

(54) NODE APPARATUS AND NODE APPARATUS CONTROL METHOD

(71) Applicant: NEC CORPORATION, Tokyo (JP)

(72) Inventor: Shohei Yamaguchi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 45 days.

(21) Appl. No.: 15/506,504

(22) PCT Filed: Aug. 19, 2015

(86) PCT No.: PCT/JP2015/004142
§ 371 (c)(1),
(2) Date: Feb. 24, 2017

(87) PCT Pub. No.: WO2016/031185
PCT Pub. Date: Mar. 3, 2016

(65) Prior Publication Data
US 2017/0254974 A1    Sep. 7, 2017

(30) Foreign Application Priority Data
Aug. 26, 2014  (JP) .................................. 2014-171530

(51) Int. Cl.
*G02B 6/43* (2006.01)
*G02B 6/293* (2006.01)
(Continued)

(52) U.S. Cl.
CPC .............. *G02B 6/43* (2013.01); *G02B 6/125* (2013.01); *H01P 1/213* (2013.01); *H04B 10/85* (2013.01);
(Continued)

(58) Field of Classification Search
CPC .. G02B 6/125; G02B 6/2932; G02B 6/29332; G02B 6/29383; G02B 6/43; G02B 27/10;
(Continued)

(56) References Cited

U.S. PATENT DOCUMENTS 2,792,493 A * 5/1957 Duckett ................... H04K 1/02
                                                                333/122
6,310,994 B1 * 10/2001 Jones .................. G02B 6/2932
                                                                385/24
(Continued)

FOREIGN PATENT DOCUMENTS

EP           2273708 A1    1/2011
JP         2011-082751 A    4/2011
(Continued)

OTHER PUBLICATIONS

Written Opinion of the International Searching Authority of PCT/JP2015/004142 dated Sep. 15, 2015.
(Continued)

*Primary Examiner* — Loha Ben
(74) *Attorney, Agent, or Firm* — Sughrue Mion, PLLC

(57) ABSTRACT

In order to prevent, without significantly reducing the power of a transmission path, a signal unnecessary for a branch station from being intercepted at the branch station, a node apparatus comprises: a first optical unit that outputs a first optical signal received from a first terminal station and addressed to a second terminal station and also outputs a second optical signal received from the first terminal station and addressed to a third terminal station; and a second optical unit that receives the first and second optical signals outputted from the first optical unit, optically removes a portion of the spectrum of the first optical signal, thereby generating a fourth optical signal, and passes the second optical signal as it is, thereby transmitting the second optical (Continued)

signal together with the fourth optical signal to the third terminal station.

15 Claims, 8 Drawing Sheets

(51) Int. Cl.
| | |
|---|---|
| *H01P 1/213* | (2006.01) |
| *H04J 14/00* | (2006.01) |
| *H04J 14/02* | (2006.01) |
| *H04B 10/85* | (2013.01) |
| *G02B 6/125* | (2006.01) |
| *H04K 1/02* | (2006.01) |
| *G02F 1/035* | (2006.01) |

(52) U.S. Cl.
CPC .............. *H04J 14/00* (2013.01); *H04J 14/02* (2013.01); *H04J 14/0212* (2013.01); *G02F 1/035* (2013.01); *G02F 2203/055* (2013.01); *H04J 14/0201* (2013.01); *H04K 1/02* (2013.01)

(58) Field of Classification Search
CPC ..... H01P 1/213; H01P 1/24; H04J 1/00; H04J 14/00; H04J 14/02; H04J 14/0201; H04J 14/0204–14/0206; H04J 14/0208; H04J 14/021; H04J 14/0212; H04J 14/0213; H04J 14/0217; H04J 2014/0238; G02F 1/035; G02F 2203/055; H04W 12/02; H04W 12/06; H04W 12/08; H04W 12/10; H04W 12/12; H04W 68/00; H04B 10/85; H04K 1/02
USPC ........ 359/618; 398/9, 42–45, 48, 49, 58, 66, 398/68, 76, 79, 104, 111, 121, 126; 455/410, 415, 418, 427, 428, 465, 523
See application file for complete search history.

(56) References Cited

U.S. PATENT DOCUMENTS

| | | | | |
|---|---|---|---|---|
| 6,404,523 | B1* | 6/2002 | Morikawa | H04B 10/0775 398/40 |
| 6,690,861 | B2* | 2/2004 | Yoneda | G02B 6/12016 385/37 |
| 6,810,180 | B2* | 10/2004 | Yoneda | G02B 6/12016 385/10 |
| 6,826,334 | B2* | 11/2004 | Yoneda | G02B 6/12016 385/10 |
| 6,912,075 | B1* | 6/2005 | Ionov | H04B 10/118 398/121 |
| 8,050,257 | B2* | 11/2011 | Beshai | H04L 49/357 370/230 |
| 8,463,236 | B2* | 6/2013 | Hapsari | H04W 12/10 455/410 |
| 8,774,200 | B2* | 7/2014 | Beshai | H04J 14/0284 370/406 |
| 9,565,487 | B2* | 2/2017 | Beshai | H04Q 11/0005 |
| 2012/0114335 | A1 | 5/2012 | Marcerou et al. | |
| 2017/0299814 | A1* | 10/2017 | Mikami | G02B 6/2932 |

FOREIGN PATENT DOCUMENTS

| | | |
|---|---|---|
| JP | 2012-531866 A | 12/2012 |
| WO | 9706614 A1 | 2/1997 |

OTHER PUBLICATIONS

International Search Report of PCT/JP2015/004142 dated Sep. 15, 2015.

Communication dated Mar. 28, 2018, from the European Patent Office in counterpart European Application No. 15835653.5.

* cited by examiner

NODE APPARATUS AND NODE APPARATUS CONTROL METHOD

TECHNICAL FIELD

The present invention relates to a node apparatus and a method of controlling the node apparatus, in particular, to a node apparatus that has a function of branching an optical signal between trunk stations to a branch station and a method of controlling the node apparatus.

BACKGROUND ART

Recently, submarine communication systems using submarine cables are increasingly introducing an optical add-drop multiplexing (OADM) system and a reconfigurable OADM (ROADM) system.

FIG. 6 is a block diagram illustrating a general configuration of a submarine communication system 900 introducing an OADM system or an ROADM system (hereinafter, referred to as an "OADM/ROADM system"). A node 910 includes an OADM/ROADM function.

Sub-bands 1 to 3 indicate wavelength bands of optical signals. An optical signal, which is transmitted from a trunk station 51 and of which wavelength band is sub-band 1, is addressed to a trunk station 52, and the optical signal, of which wavelength band is sub-band 2, is addressed to a branch station 53. It is noted that hereinafter the "optical signal, of which wavelength band is sub-band 1 (or 2, 3)" is referred to as the "optical signal of sub-band 1 (or 2, 3)."

The node 910 transmits the optical signal of sub-band 2, from among the optical signal 13 received from the trunk station 51, to the branch station 53. The node 910 branches the optical signal of sub-band 1 included in the optical signal 13 received from the trunk station 51 into two and respectively transmits the branched optical signals to the trunk station 52 and the branch station 53. Further, the node 910 removes a dummy signal 5 from an optical signal 15 received from the branch station 53. Then, the node 910 transmits an optical signal 14 that combines the optical signal of sub-band 3 that was received from the branch station 53 and the optical signal of sub-band 1 that was received from the trunk station 51 to the trunk station 52. Optical submarine relay devices, not illustrated, are installed on the submarine cables between the node 910 and the trunk stations 51, 52 and between the node 910 and the branch station 53.

In FIG. 6, as the optical signal addressed to the branch station 53 is only the optical signal of sub-band 2, the optical signal of sub-band 1 addressed to the trunk station 52 is not necessarily transmitted to the branch station 53. However, by additionally transmitting the optical signal of sub-band 1 to the branch station 53, the input power to an optical submarine relay device that is installed between the node 910 and the branch station 53 can be maintained without too much drop compared with the optical signal 13. As the result, the optical submarine relay devices used in the submarine communication system 900 can operate within a predetermined rating range that is common throughout the submarine communication system 900. For the same reason, the branch station 53 transmits a dummy signal 5 in addition to the optical signal of sub-band 3.

FIG. 7 is a diagram illustrating wavelength bands of optical signals 13 to 15 that are transmitted to and from the node 910. In FIG. 7, the wavelength band of the optical signal 13 is divided into two wavelength bands, the optical signal 1 of sub-band 1 and the optical signal 2 of sub-band 2. The wavelength band of the optical signal 14 is divided into two wavelength bands, the optical signal 1 of sub-band 1 and the optical signal 3 of sub-band 3. Further, the wavelength band of the optical signal 15 is divided into two wavelength bands, the dummy signal and the optical signal 3 of sub-band 3. The wavelength band of sub-band 1 coincides with the wavelength band of the dummy signal. The wavelength band of sub-band 2 also coincides with the wavelength band of sub-band 3. The wavelength band of sub-band 1 does not overlap the wavelength band of sub-band 2. The optical signals 13 to 15 have channels, each of which can transmit at least one carrier (optical carrier waves). The optical signals of sub-bands 1 to 3 also have channels, each of which can transmit at least one carrier. The carriers are wavelength-multiplexed and transmitted respectively as the optical signals 13 to 15.

FIG. 8 is a diagram illustrating a more detailed configuration of the submarine communication system 900 illustrated in FIG. 6. The submarine communication system 900 includes trunk stations 51 and 52, a branch station 53, and a node 910. The trunk stations 51, 52 and branch station 53 transmit and receive the optical signals 1 to 3 and dummy signal as illustrated in FIG. 7 via the node 910. The node 910 includes optical couplers 6 and 12 and wavelength filters 7 and 8. The trunk stations 51, 52 and the branch station 53 are connected to the node 910 by submarine cables including optical submarine relay devices 54.

The trunk station 51 transmits the optical signal 1 of sub-band 1 and the optical signal 2 of sub-band 2. The optical signals 1, 2 are branched into two at the optical coupler 6 of the node 910. The one of the optical signals 1, 2 branched into two is transmitted to the branch station 53. The other one of the optical signals 1, 2 branched into two at the coupler 6 is transmitted to the trunk station 52 through the wavelength filter 7 and the optical coupler 12. The wavelength filter 7 blocks the optical signal of the wavelength band of sub-band 2.

As described above, the optical signal 1, as well as, the optical signal 2 are transmitted from the node 910 to the branch station 53 in such a way that the optical submarine relay device 54 installed on the transmission path from the node 910 to the branch station 53 operates within a rating range. As the result, the branch station 53 receives the optical signal 2 that is the target signal, as well as, the optical signal 1 that is addressed to the trunk station 52.

In relation to the present invention, PTL 1 discloses a technique of preventing a terminal station from receiving unnecessary optical signals by blocking the unnecessary optical signals in corresponding sub-band using a cut-off filter arranged on a transmission path.

CITATION LIST

Patent Literature

[PTL 1]: Japanese Laid-out Patent Application Publication No. 2011-082751 (paragraphs [0020]-[0021], FIG. 1)

SUMMARY OF INVENTION

Technical Problem

In a submarine communication system 900 illustrated in FIG. 8, the optical signal 1 of sub-band 1, which is actually not necessary for the branch station 53, is transmitted to the branch station 53 in such a way that the optical submarine relay device 54 installed between the node 910 and the branch station 53 operates within a rating range. As the result, the branch station 53 can receive the optical signal 1 of sub-band 1 that is addressed to the trunk station 52. As such, the security of the optical signal of sub-band 1 may not be fully ensured at the branch station 53.

PTL 1 discloses a configuration where an optical signal of a wavelength band (S-band or L-band) that is not necessary at a branch station is removed using an optical filter. However, the configuration disclosed in PTL 1 reduces the power of the optical signal that is transmitted through the transmission path after passing through the optical filter since all the optical signals that have wavelength bands of S-band or L-band are removed by the optical filter. Thus, the optical filter is required to be placed inside or near the branch station in order to prevent the optical submarine relay device from operating outside the rating due to reduction of the input power to the optical submarine relay device. However, in such a case, the trunk signal is transmitted to or near the branch station. As such, the technique disclosed in PTL 1 also embodies a problem where the security of the optical signals that are included in the trunk signal, yet, are not addressed to the branch station is not fully ensured.

Objective of the Invention

The objective of the present invention is to provide a node apparatus and a method of controlling the node apparatus for preventing a signal unnecessary for a branch station from being intercepted at the branch station without significantly reducing the power of a transmission path.

Solution to Problem

The node apparatus of the present invention includes: a first optical unit that outputs a first optical signal received from a first terminal station and addressed to a second terminal station and a second optical signal received from the first terminal station and addressed to a third terminal station: and a second optical unit that receives the first and second optical signals outputted from the first optical unit, optically removes a portion of the spectrum of the first optical signal to generate a fourth optical signal, and passes the second optical signal as it is to transmit the second and fourth optical signals to the third terminal station.

The method of controlling a node apparatus of the present invention includes: outputting a first optical signal received from a first terminal station and addressed to a second terminal station and a second optical signal received from the first terminal station and addressed to a third terminal station; optically removing a portion of the spectrum of the outputted first optical signal to generate a fourth optical signal, and transmitting the second and fourth optical signals to the third terminal station.

Advantageous Effects of Invention

The node apparatus and the method of controlling the node apparatus of the present invention can prevent a signal unnecessary for a branch station from being intercepted at the branch station without significantly reducing the power of a transmission path.

DESCRIPTION OF EMBODIMENTS

Overview of Example Embodiments

In the following example embodiments, in a submarine communication system including trunk stations, a branch station, and a node, from among the optical signals to be received at the branch station, a trunk signal that is unnecessary for the branch station is invalidated at the node. Invalidation of a trunk signal is performed by an optical device having a wavelength splitting function or a filtering function, such as, a wavelength filter, a wavelength selective switch (WSS), or an optical interleaver.

Specifically, a WSS module or an optical interleaver cuts out a portion of the spectrum of an optical signal unnecessary for a branch station. Since the wavelength form of the optical signal is degraded by cutting out a portion of the spectrum of the optical signal, the optical signal cannot be reproduced at the branch station. As only a portion of the spectrum of the optical signal is cut out, the power of the optical signal is not significantly reduced. As such, the trunk signal unnecessary for the branch station is invalidated.

First Example Embodiment

Figure 1:
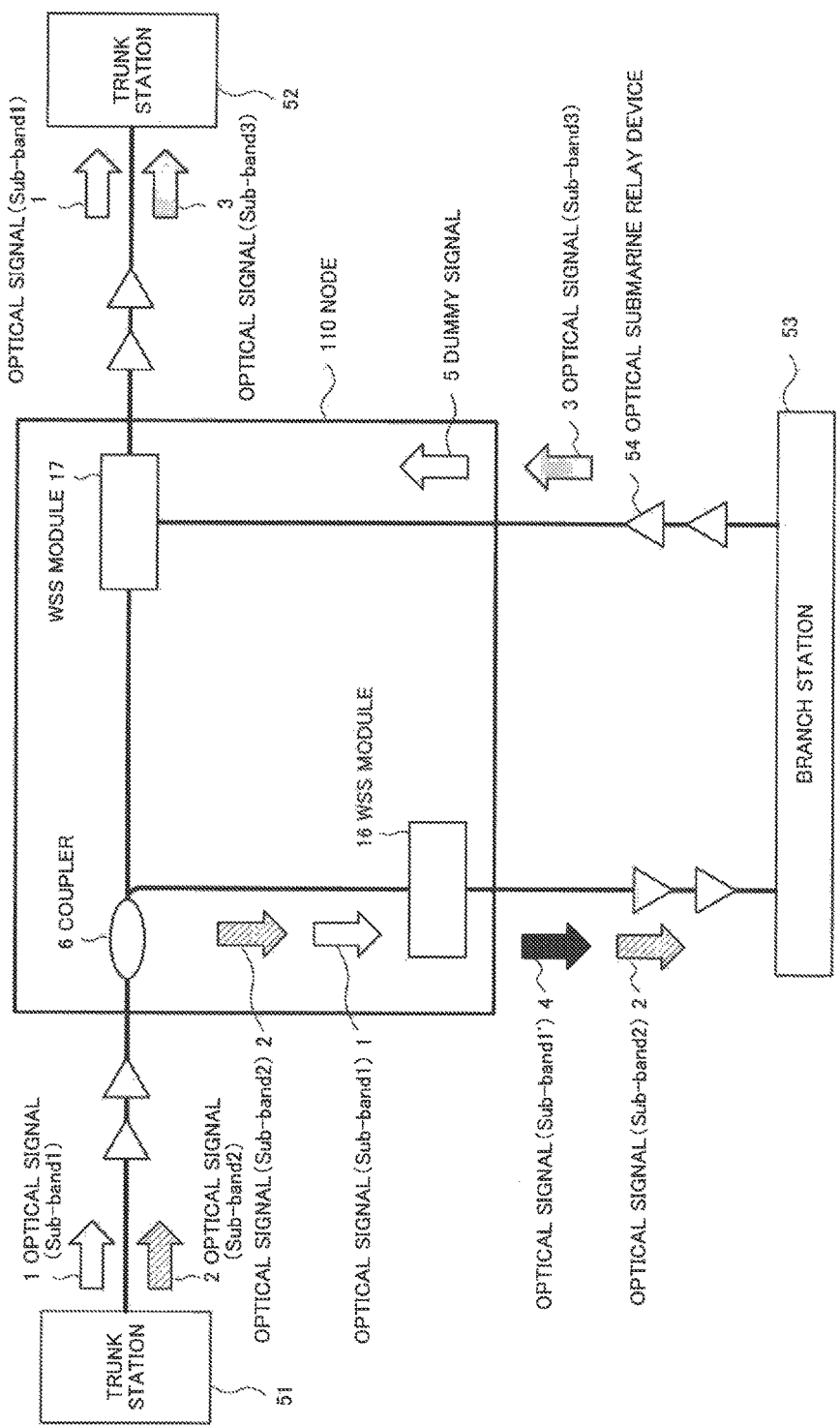
FIG. 1 is a block diagram illustrating a configuration of a submarine communication system according to a first example embodiment of the present invention.

FIG. 1 is a block diagram illustrating a configuration of a submarine communication system 100 according to a first example embodiment of the present invention. The submarine communication system 100 is a submarine cable communication system in which trunk stations 51, 52 and a branch station 53 are connected to a node 110. The trunk stations 51, 52 and the branch station 53 are connected to the node 110 by submarine optical cables. Optical submarine relay devices 54 are installed on the submarine optical cables. The number of the optical submarine relay devices 54 and gaps therebetween are determined by the installation condition of the submarine communication system 100.

The node 110 includes a coupler 6 and WSS modules 16, 17. The coupler 6 of the first example embodiment is a 1:1 directional coupler. The WSS modules 16, 17 transmit and output only the light of a wavelength band within a predetermined range from among the entered optical signal.

The trunk station 51 wavelength-multiplexes an optical signal 1 of sub-band 1 and an optical signal 2 of sub-band 2 and transmits the multiplexed optical signal to the node 110. The optical signal 1 is addressed to the trunk station 52 and the optical signal 2 is addressed to the branch station 53. The branch station 53 transmits an optical signal 3 of sub-band 3 and a dummy signal 5 to the node 110. The optical signal 3 is addressed to the trunk station 52. The dummy signal 5 is a signal that does not have information to be conveyed.

Figure 2:
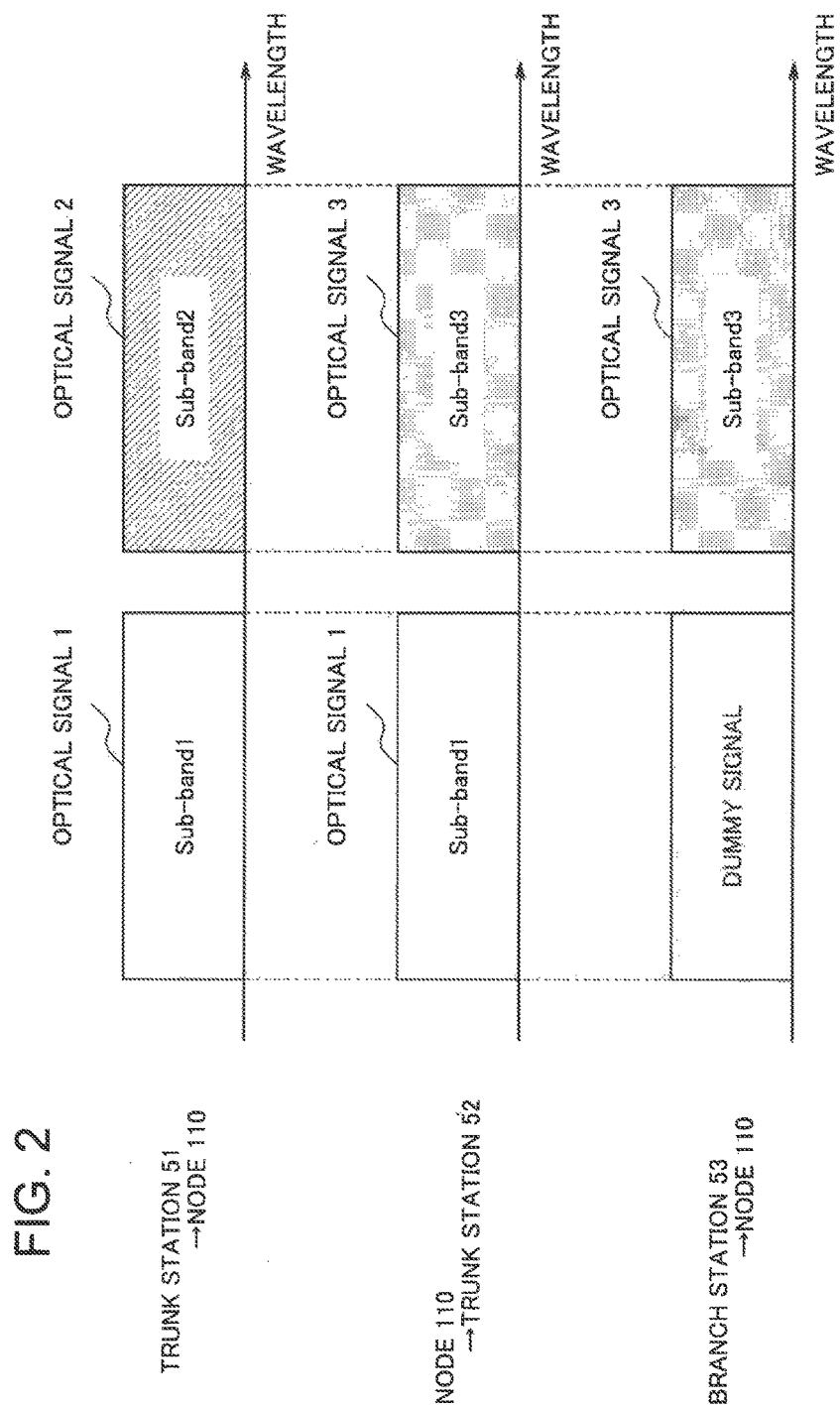
FIG. 2 is a diagram illustrating a relationship among the wavelength bands of sub-bands and a dummy signal.

The relationship among the wavelength bands of the optical signals of sub-bands 1 to 3 and the dummy signal 5 is illustrated in FIG. 2. The wavelength bands of sub-band 1 and dummy signal are the same, and the wavelength bands of sub-band 2 and sub-band 3 are the same. Whereas, the wavelength band of sub-band 1 does not overlap the wavelength band of sub-band 2. The optical signal 1 of sub-band 1 and the optical signal 2 of sub-band 2 are wavelength-multiplexed and transmitted from the trunk station 51 to the node 110. The optical signal 1 of sub-band 1 and the optical signal 3 of sub-band 3 are wavelength-multiplexed and transmitted from the node 110 to the trunk station 52. The dummy signal 5 and the optical signal of sub-band 3 are wavelength-multiplexed and transmitted from the branch station 53 to the node 110.

The optical signal 1 and optical signal 2 transmitted from the trunk station 51 are branched at the coupler 6 to the direction of the trunk station 52 and to the direction of the branch station 53. The optical signals 1, 2 branched to the direction of the branch station 53 are inputted to the WSS module 16. The WSS module 16 performs processing in such a way that only the optical signal 2 is receivable at the branch station 53. The signal outputted from the WSS module 16 is transmitted to the branch station 53. The processing of the WSS module 16 will be described later.

On the other hand, the optical signals 1, 2 branched by the coupler 6 to the direction of the trunk station 52 are inputted to the WSS module 17. The WSS module 17 blocks the optical signal 2 and passes the optical signal 1.

The branch station 53 transmits the optical signal 3 and the dummy signal 5 to the trunk station 52. The optical signal 3 is a signal transmitted from the branch station 53 and addressed to the trunk station 52. The wavelength band of the optical signal 3 is the same as the sub-band 2. The dummy signal 5 is used to increase the total power of the optical signal directed from the branch station 53 to the node 110 and cause the optical submarine relay device 54 on the transmission path to operate within the rating range. The dummy signal 5 is an optical signal of the wavelength band of sub band 1.

The optical signal 3 and dummy signal 5 transmitted from the branch station 53 are inputted to the WSS module 17. The WSS module 17 blocks the wavelength band of the dummy signal 5, as well as, wavelength-multiplexes the optical signal 1 received from the trunk station 51 and the optical signal 3 received from the branch station 53, and transmits the multiplexed signal to the trunk station 52. As the wavelength band of the optical signal 1 is sub-band 1 and the wavelength band of the optical signal 3 is sub-band 3, the wavelength bands of the optical signal 1 and the optical signal 3 do not overlap. The trunk station 52 receives the optical signals 1 and 3 transmitted by the WSS module 17.

Next, the optical signal transmitted from the node 110 to the branch station 53 will be described. The optical signals 1, 2 branched by the coupler 6 to the direction of the branch station 53 are passed through the WSS module 16 and outputted to the branch station 53 side. Here, the optical signal 1 is addressed to the trunk station 52 and the optical signal 1 is unnecessary for the branch station 53. Thus, a portion of the spectrum of the optical signal 1 is cut out by the WSS module 16. That is, a portion of the spread of the spectrum of an optical signal of each channel included in the optical signal 1 is blocked. Such operation of cutting out a portion of the spread of the spectrum of an optical signal is hereinafter referred to as spectral slitting. The spectral slitting degrades the signal waveform of the optical signal 1, generating an optical signal 4 that is difficult to be received at the branch station 53.

Figure 3:
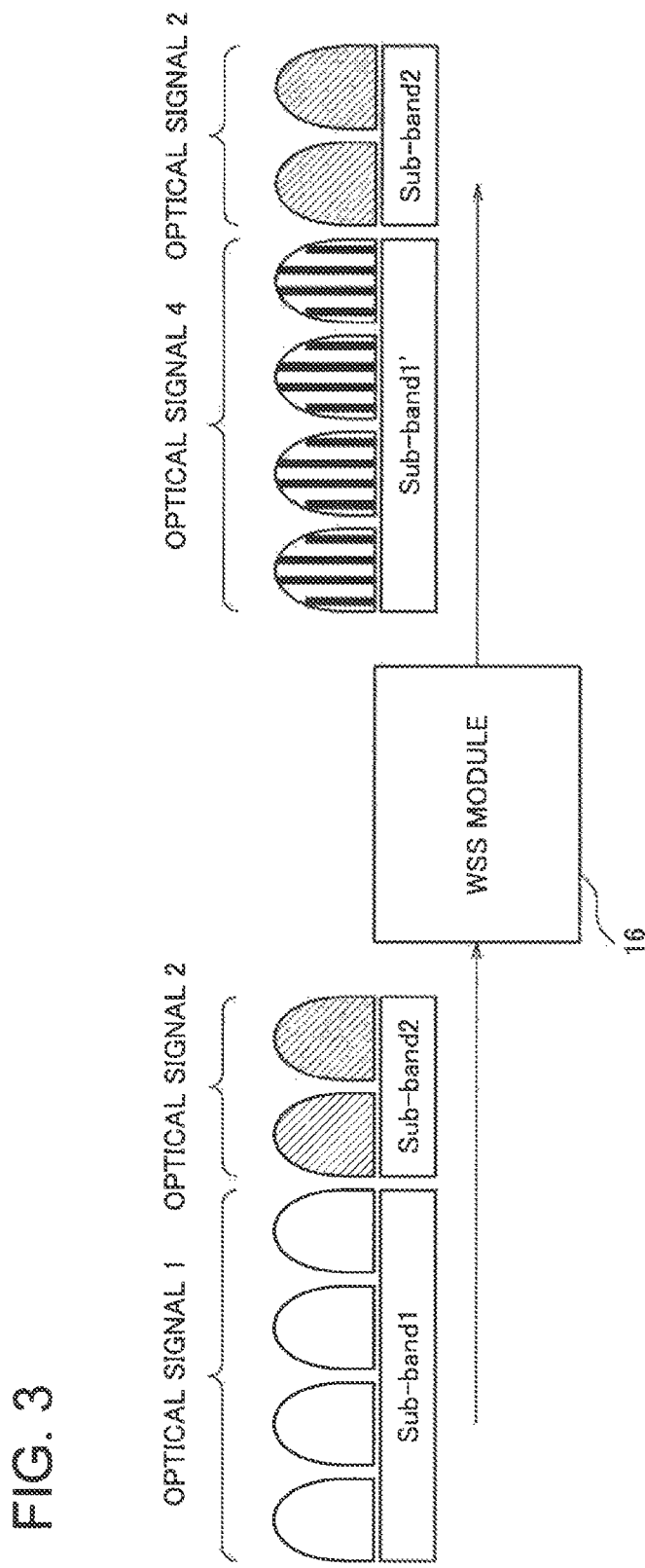
FIG. 3 is a diagram illustrating spectral slitting by a wavelength selective switch (WSS) module.

FIG. 3 is a diagram illustrating the processing of spectral slitting by the WSS module 16. The optical signal 1 of sub-band 1 and the optical signal 2 of sub-band 2 are inputted to the WSS module 16. The optical signal 1 and the optical signal 2 respectively include a plurality of carriers (optical carrier waves) of different wavelengths. FIG. 3 schematically illustrates an example where the optical signal 1 includes four carriers and the optical signal 2 includes two carriers. The WSS module 16 splits the entered light into a plurality of wavelength bands and transmits or blocks light for each split wavelength band. As such, the WSS module 16 can remove (block) a portion of the spread of the spectrum for each of the four carriers included in the optical signal 1. The optical signal 1 of sub-band 1 becomes the optical signal 4 of sub-band 1' after passing through the WSS module 16. The black portion (slit) of the spectrum of each carrier included in the sub-band 1', illustrated in FIG. 3, is an example schematically illustrating the removed spectrum. In this way, the WSS module 16 degrades and invalidates the signal waveform of the optical signal 1 by removing a portion of the spectrum and outputs as the optical signal 4. The invalidation processing by the WSS module 16 is not performed for the optical signal 2 of sub-band 2.

The optical signal 1 is invalidated by spectral slitting, thereby becoming the optical signal 4. As the result, the branch station 53 cannot normally receive the received optical signal 4. Thus, with regard to the trunk signal that is branched from the trunk station 51 to the branch station 53, the submarine communication system 100 of the first example embodiment can make it difficult for the branch station 53 to intercept the unnecessary optical signal 1.

The spectral slitting of the WSS module 16 decreases the power of the optical signal transmitted from the node 110 to the branch station 53 for the amount corresponding to the cut-out spectrum. However, compared with a case where an optical filter blocks sub-band 1 as a whole, the reduced amount of power of the optical signal transmitted from the node 110 to the branch station 53 is small. As such, the input and output power of the optical submarine relay device 54 installed on the transmission path from the node 110 to the branch station 53 is restored to the rating range after being relayed for several times. For example, by operating the optical amplifier equipped in the optical submarine relay device in a saturation region, even if the input power to the optical amplifier is somewhat reduced at the initial stage, the output power of the optical submarine relay device can be restored to the rating value after being relayed for several times. This is known as the self-healing effect of the optical submarine relay system. As such, the submarine communication system 100 of the first example embodiment can ensure the security of an optical signal unnecessary for a branch station while operating the optical submarine relay device on the branch side at rating.

The variation amount of the optical power caused by spectral slitting may be controlled by the width of the spectrum removed by spectral slitting. Further, the width and shape of the spectrum removed by spectral slitting may be determined by the range of the input power allowed by the optical submarine relay device 54 and difficulty of interception of the optical signal 1 at the branch station 53. Widening the width of the spectrum removed by spectral slitting can make interception difficult at the branch station 53, while reducing the optical power transmitted from the node 110.

Further, the difficulty of interception may be defined based on the error rate of the optical signal 1 at the branch station 53. For example, the difficulty of interception of the optical signal 1 may be defined higher, as the error rate of the optical signal 1 at the branch station 53 is higher.

As described above, the submarine communication system 100 of the first example embodiment can transmit only a target optical signal to a branch station while ensuring the security of an optical signal unnecessary for the branch station. This is because, as the result of removing (by spectral slitting) and invalidating a portion of the spectrum of the optical signal unnecessary for the branch station, the invalidated optical signal becomes difficult to be intercepted at the branch station. Spectral slitting reduces the optical signal power inputted to the optical submarine relay device. However, the self-healing effect of the optical submarine relay device restores the optical power through relay for several times. As such, the optical submarine relay device installed in the direction toward the branch station can operate within a rating range.

That is, the submarine communication system 100 of the first example embodiment can prevent a signal unnecessary for a branch station from being intercepted at the branch station without significantly reducing the power of the transmission path.

Second Example Embodiment

Figure 4:
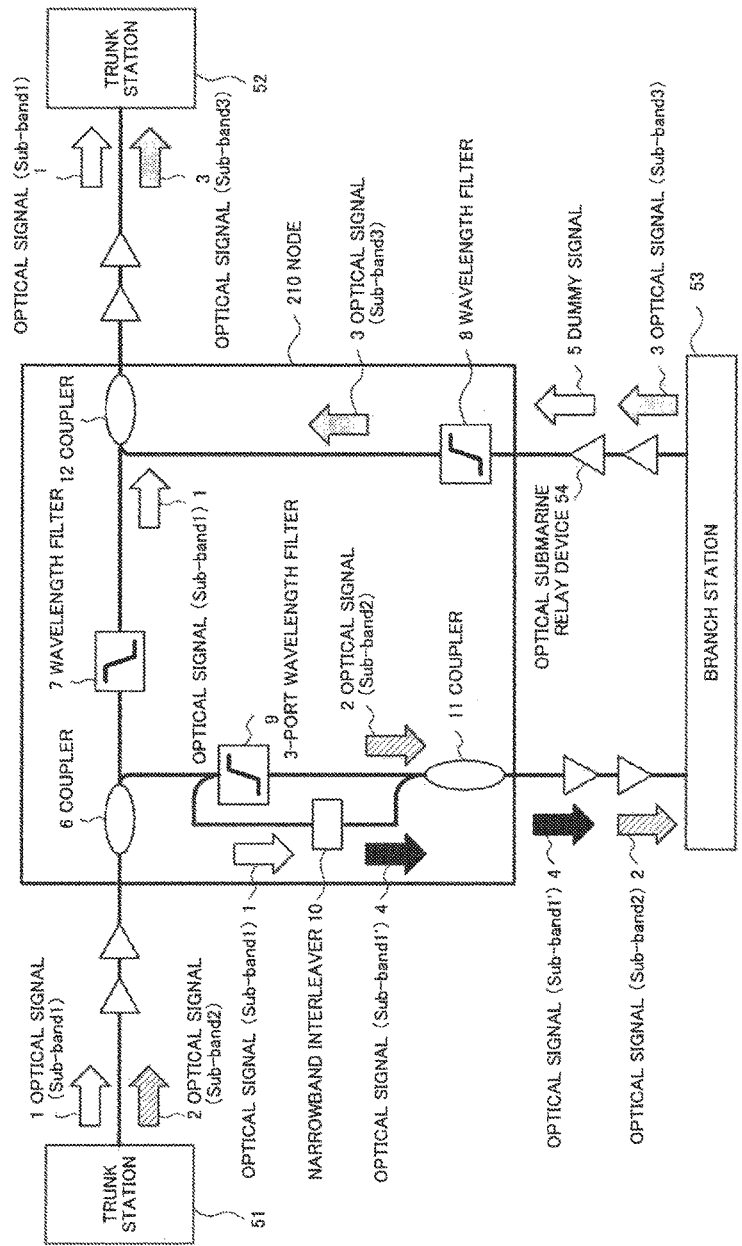
FIG. 4 is a block diagram illustrating a configuration of a submarine communication system according to a second example embodiment of the present invention.

FIG. 4 is a block diagram illustrating a configuration of a submarine communication system 200 according to a second example embodiment of the present invention. In the drawings of FIG. 4 and after, the same components as the components described in the foregoing drawings are appended the same reference signs, of which redundant explanation will be omitted. The submarine communication system 200 includes trunk stations 51 and 52, a branch station 53, and a node 210. The trunk stations 51, 52 and the branch station 53 are connected to the node 210 by submarine optical cables. The node 210 differs from the node 110 described in FIG. 1 in that the node 210 does not include the WSS modules 16, 17, yet, includes wavelength filters 7, 8 and a 3-port wavelength filter 9, a narrowband interleaver 10, and couplers 11, 12.

The 3-port wavelength filter 9 splits the optical signals 1, 2, which were branched by the coupler 6 and directed toward the branch station 53, to the optical signal 1 of sub-band 1 and the optical signal 2 of sub-band 2. The 3-port wavelength filter 9 splits the optical signal 1 of sub-band 1 and the optical signal 2 of sub-band 2 using, for example, a multi-layered dielectric filter, of which reflectivity and transmissivity vary depending on wavelengths. The optical signal 1 is treated with invalidation processing by spectral slitting in the same way as the first example embodiment by the narrowband interleaver 10 and outputted as an optical signal 4. That is, the signal waveform of the optical signal 1 is treated with invalidation processing to the extent that the branch station 53 cannot intercept the optical signal 1, in the same way as the optical signal 1 of FIG. 3, by the narrowband interleaver 10 and outputted as the optical signal 4. The coupler 11 combines the optical signal 4 of sub-band 1' and the optical signal 2 of sub-band 2 and transmits the combined optical signal to the branch station 53. The optical signals 2, 4 outputted from the coupler 11 are transmitted through a submarine cable including the optical submarine relay device 54 and received at the branch station 53. A directional coupler may be used as the coupler 11. As an alternative, a multiplexer that can wavelength-multiplex the optical signal 4 of sub-band 1' and the optical signal 2 of sub-band 2 may be used as the coupler 11.

On the other hand, the optical signals 1, 2 that were branched at the coupler 6 and transmitted to the direction of the trunk station 52 are removed of the optical signal 2 of sub-band 2 by the wavelength filter 7, thus, only the optical signal 1 of sub-band 1 is inputted to the coupler 12.

The branch station 53 transmits the optical signal 3 that is addressed to the trunk station 52, as well as, a dummy signal 5 to the node 210. The dummy signal 5 received from the branch station 53 is removed by the wavelength filter 8, and only the optical signal 3 is inputted to the coupler 12. The coupler 12 combines the optical signal 1 and the optical signal 3 and outputs the combined signal to the trunk station 52. A directional coupler may be used as the coupler 12. As an alternative, a multiplexer that can wavelength-multiplex the optical signal 1 of sub-band 1 and the optical signal 3 of sub-band 3 may be used as the coupler 12.

The submarine communication system 200 of the second example embodiment invalidates an optical signal unnecessary for the branch station 53 by removing a portion of the spectrum of the optical signal (spectral slitting) in the same way as the submarine communication system 100 of the first example embodiment. The submarine communication system 200 of the second example embodiment can prevent a signal unnecessary for the branch station 53 from being intercepted at the branch station without significantly reducing the power of the transmission path.

Further, while the submarine communication system 200 of the second example embodiment has the increased number of components constituting the node 201, an expensive WSS module is not required. As such, the submarine communication system 200 provides an effect of reducing the costs compared with the submarine communication system 100 of the first example embodiment.

Third Example Embodiment

Figure 5:
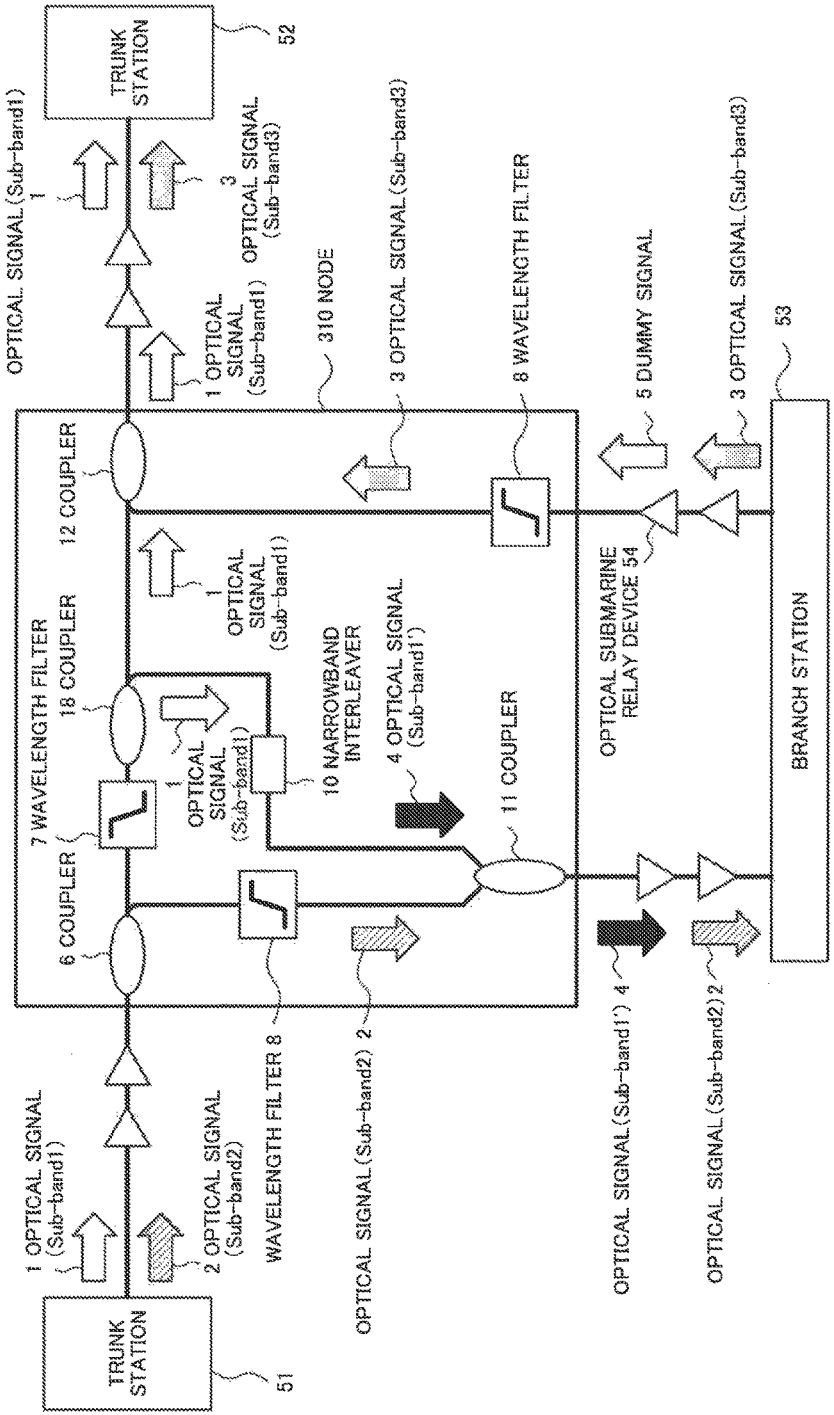
FIG. 5 is a block diagram illustrating a configuration of a submarine communication system according to a third example embodiment of the present invention.
Figure 6:
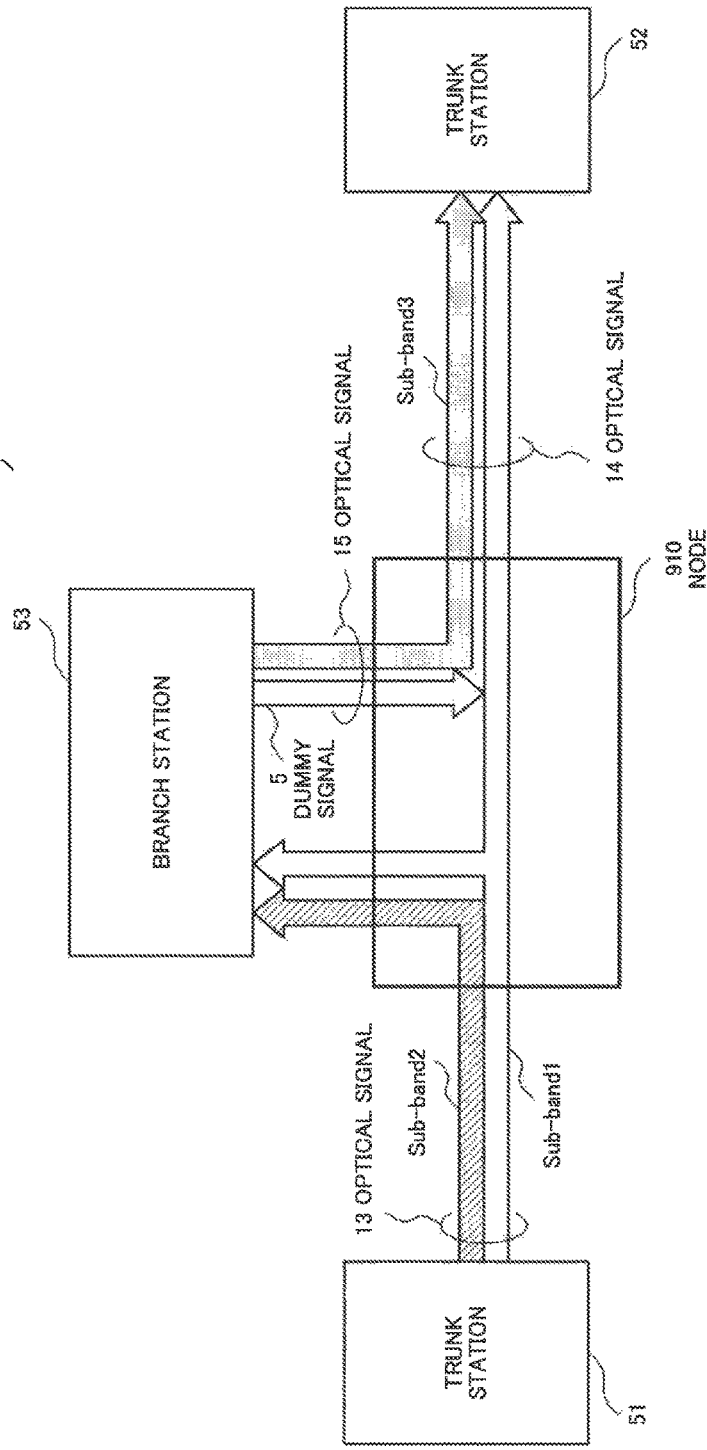
FIG. 6 is a block diagram illustrating a general configuration of a submarine communication system introducing an OADM/ROADM system.
Figure 7:
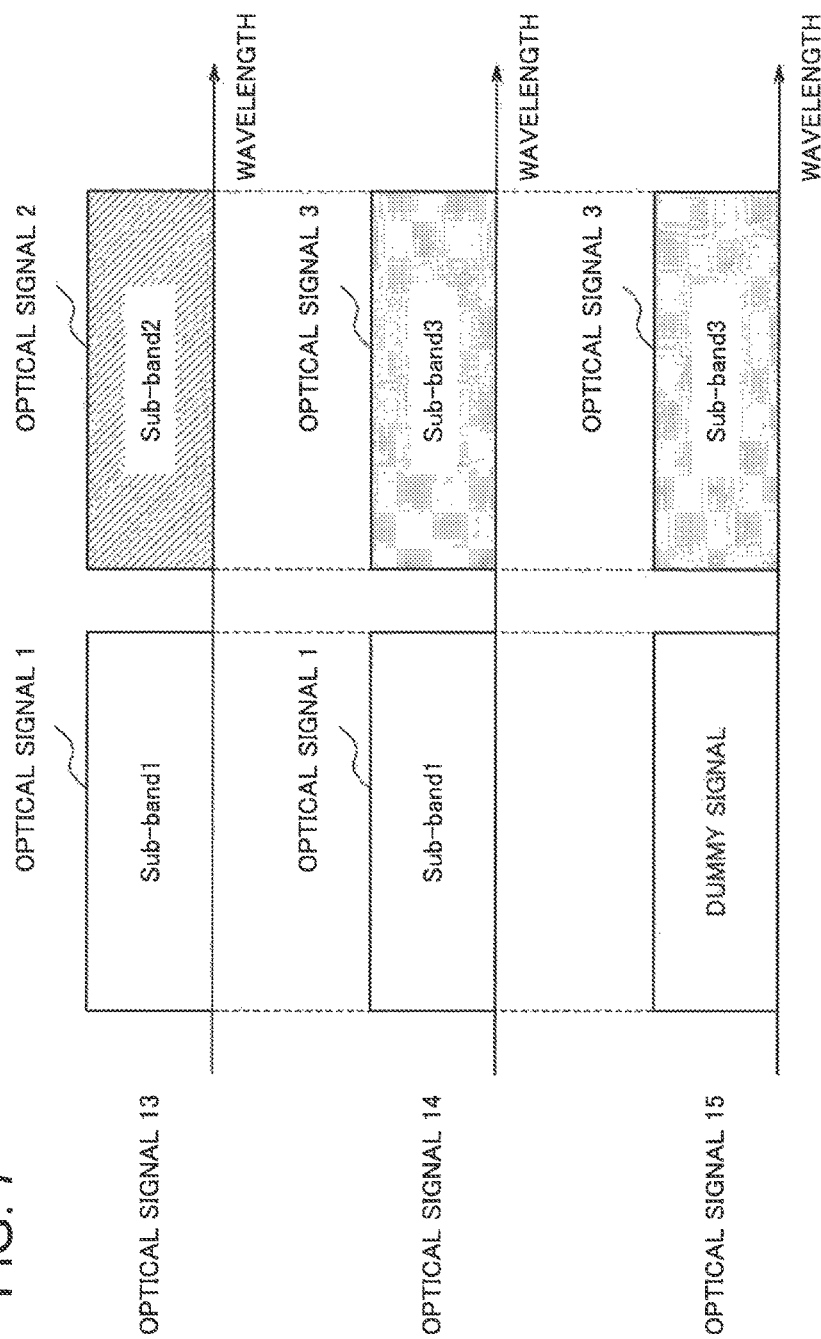
FIG. 7 is a diagram illustrating the wavelength bands of optical signals that are transmitted to and from a node.
Figure 8:
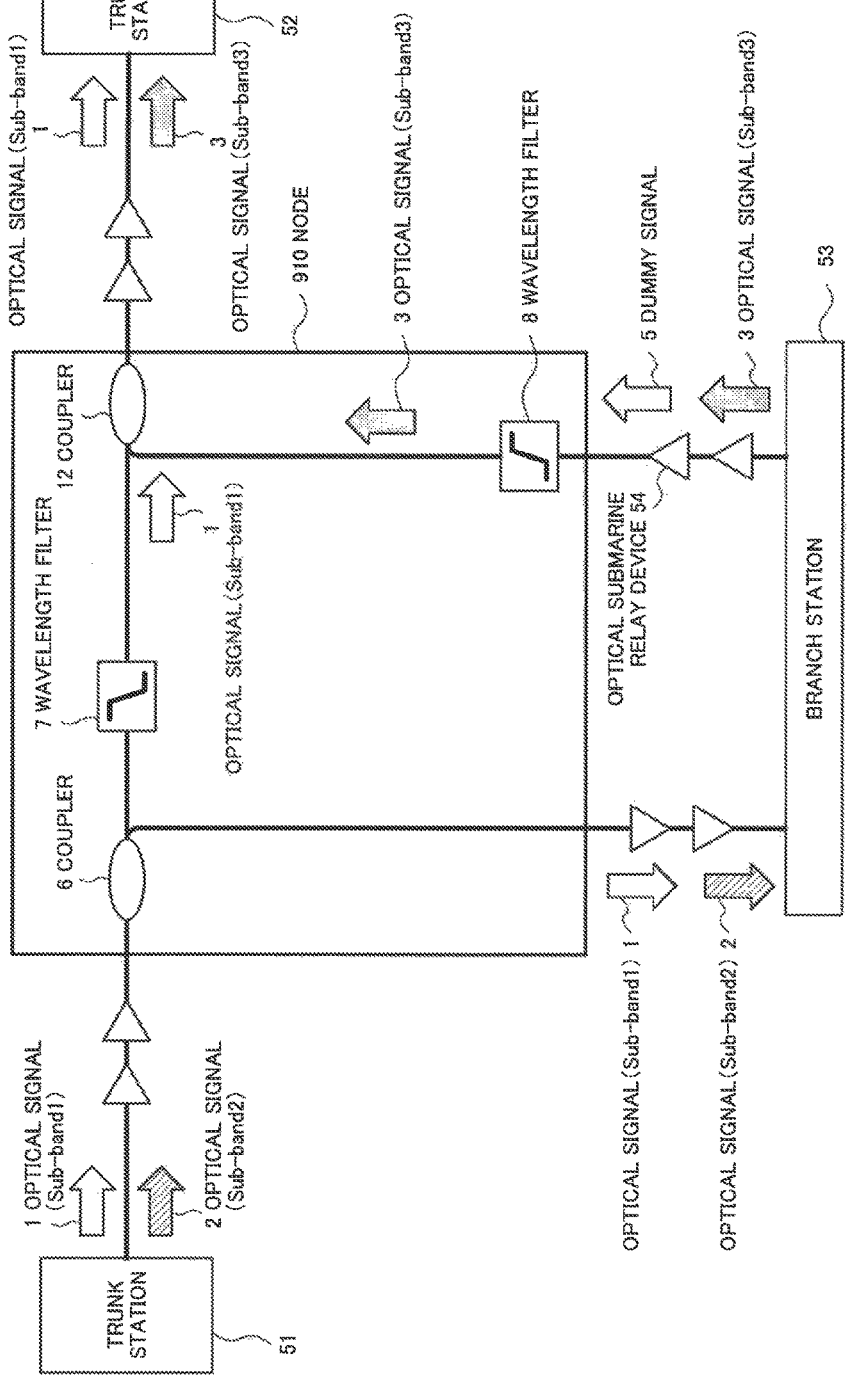
FIG. 8 is a diagram illustrating a detailed configuration of a general submarine communication system.

FIG. 5 is a block diagram illustrating a configuration of a submarine communication system 300 according to a third example embodiment of the present invention. The submarine communication system 300 includes trunk stations 51 and 52, a branch station 53, and a node 310. The trunk stations 51, 52 and the branch station 53 are connected to the node 310 by submarine optical cables. The node 310 differs from the node 210 described in FIG. 4 in that the node 310 does not include the 3-port wavelength filter 9, yet, includes a coupler 18 and two wavelength filters 8.

At the node 310, of the optical signals 1, 2 that were branched by the coupler 6 and directed toward the branch station 53, the wavelength filter 8 transmits only the optical signal 2 of sub-band 2 and blocks the optical signal 1 of sub-band 1.

On the other hand, for the other signals branched by the coupler 6, the wavelength filter 7 removes the optical signal 2 and inputs only the optical signal 1 to the coupler 18. The coupler 18 branches the optical signal 1 inputted from the wavelength filter 7 into two. One of the optical signal 1 branched by the coupler 18 is treated with invalidation processing by spectral slitting by the narrowband interleaver 10 to the extent that the branch station 53 cannot intercept the optical signal 1 and outputted as an optical signal 4. The other one of the optical signal 1 branched by the coupler 18 is inputted to the coupler 12. The coupler 11 combines the optical signal 2 and the optical signal 4 and transmits the combined signal to the branch station 53. The optical signals 2, 4 transmitted from the coupler 11 are transmitted through a submarine cable including an optical submarine relay device 54 and received by the branch station 53.

The branch station 53 receives the optical signal 2 and the optical signal 4 that were transmitted from the node 310, as well as, transmits an optical signal 3 addressed to the trunk station 52 and a dummy signal 5 to the node 310. The dummy optical signal 5 is removed by the wavelength filter 8 disposed on the branch station 53 side of the coupler 12, and only the optical signal 3 is inputted to the coupler 12. The coupler 12 combines the optical signal 1 and the optical signal 3 and transmits the combined signal to the trunk station 52. It is noted that, in the same way as the second example embodiment, directional couplers or multiplexers can be used for the couplers 11 and 12.

The submarine communication system 300 of the third example embodiment also invalidates an optical signal unnecessary for a branch station by removing a portion of the spectrum of the optical signal (spectral slitting) in the same way as the submarine communication system 100 of the first example embodiment. The submarine communication system 300 of the third example embodiment can prevent a signal unnecessary for a branch station from being intercepted at the branch station without significantly reducing the power of the transmission path.

Further, in the same way as the submarine communication system 200 of the second example embodiment, the submarine communication system 300 of the third example embodiment can provide a similar effect as the submarine communication system 100 of the first example embodiment without using a WSS module.

Minimum Configuration of Example Embodiments

The effect of the submarine communication system 100 of the first example embodiment can also be provided by the following node apparatus that includes a portion of the configuration of the node 110 of FIG. 1. That is, the node apparatus includes a first optical unit and a second optical unit. The first optical unit (the coupler 6 of FIG. 1) outputs the first optical signal that is received from the first terminal station (the trunk station 51) and addressed to the second terminal station (the terminal station 52) and the second optical signal that is received from the first terminal station and addressed to the third terminal station (the branch station 53). The second optical unit (the WSS module 16) receives the first and second optical signals that were outputted from the first optical unit and optically removes a portion of the spectrum of the first optical signal to generate a fourth optical signal. Further, the second optical unit passes the second optical signal as it is and transmits the second and fourth optical signals to the third terminal station.

The node apparatus that includes such a configuration optically removes a portion of the spectrum of the first optical signal, making it difficult to be intercepted at the third terminal station. Thus, in the same way as the node apparatus of the first example embodiment, the above-described node apparatus can also prevent a signal unnecessary for a branch station from being intercepted at the branch station without significantly reducing the power of the transmission path.

Further, the above-described second optical unit may include the 3-port wavelength filter 9, narrowband interleaver 10, and coupler 11 of the node 210 as described with reference to FIG. 4.

As an alternative, the above-described first optical unit may include the coupler 6, wavelength filter 7, and coupler 18 of the node 310 as described with reference to FIG. 5. Further, the second optical unit may include the wavelength filter 8, narrowband interleaver 10, and coupler 11 of the node 310 as described with reference to FIG. 5.

The claimed invention has been described so far with reference to the above-described example embodiments, without limitation thereto. A variety of modifications that will be understood by those skilled in the art can be made to the configuration and details of the claimed invention within the scope thereof.

For example, although each example embodiment has been described with the example of a submarine communication system, the configuration of each example embodiment can also be adapted to land communications.

This application claims priority based on Japanese Patent Application No. 2014-171530 filed on Aug. 26, 2014, which application is incorporated herein in its entirety by disclosure.

REFERENCE SIGNS LIST 100, 200, 300, 900 Submarine communication system
110, 210, 310, 910 Node
1, 2, 3, 4, 13, 14, 15 Optical signal
5 Dummy signal
6, 11, 12, 18 Coupler
7, 8 Wavelength filter
9 3-port wavelength filter
10 Narrowband interleaver
16, 17 WSS module
51, 52 Trunk station
53 Branch station
54 Optical submarine relay device

The invention claimed is:

1. A node apparatus comprising:
a first optical circuit that outputs a first combined signal, the first combined signal comprising: a first optical signal received from a first terminal station and addressed to a second terminal station, and a second optical signal received from the first terminal station and addressed to a third terminal station; and
a second optical circuit that receives the first combined signal outputted from the first optical circuit, optically removes a portion of a spectrum of the first optical signal to generate a third optical signal, and transmits, without change, the second optical signal, thereby outputting the second optical signal and the third optical signal to the third terminal station;
wherein the second optical circuit comprises:
a three-port wavelength filter configured to split the first combined signal from the first optical circuit into the first optical signal and the second optical signal;
a narrowband interleaver configured to divide the spectrum of the first optical signal into a plurality of wavelength bands and optically remove at least one wavelength band between each two adjacent wavelength bands, thereby outputting a signal having a discontinuous spectrum as the third optical signal, and
a first optical coupler configured to combine the second optical signal and the third optical signal into a second combined signal and transmit the second combined signal to the third terminal station.

2. The node apparatus according to claim 1, further comprising:
a third optical circuit, wherein the first optical circuit comprises a second optical coupler configured to branch the first combined signal received from the first terminal station into a first branched signal and a second branched signal and outputting the first branched signal and the second branched signal, wherein the first branched signal is inputted to the second optical circuit, and wherein the third optical circuit transmits only a fourth optical signal received from the third terminal station and addressed to the second terminal station, and the first optical signal included in the second branched signal to the second terminal station.

3. A communication system, wherein first to third terminal stations are connected to the node apparatus according to claim 2 through transmission paths.

4. The communication system according to claim 3, wherein a removal amount of the spectrum of the first optical signal by narrowband interleaver is determined in such a way that the third optical signal is difficult to be intercepted at the third terminal station and a reduced amount of power of the third optical signal due to the removal of the spectrum is within a predetermined range.

5. A communication system, wherein first to third terminal stations are connected to the node apparatus according to claim 1 through transmission paths.

6. The communication system according to claim 5, wherein a removal amount of a spectrum of the first optical signal by the second optical circuit is determined in such a way that the third optical signal is difficult to be intercepted at the third terminal station and a reduced amount of power of the third optical signal due to the removal of the spectrum is within a predetermined range.

7. The communication system according to claim 6, wherein a relay device is provided on a transmission path directed from the node apparatus to the third terminal station, and the reduced amount of power of the third optical signal is determined in such a way not to be deviated from a rating of the relay device.

8. A node apparatus comprising:

a first optical circuit that outputs a first combined signal, the first combined signal comprising a first optical signal received from a first terminal station and addressed to a second terminal station, and a second optical signal received from the first terminal station and addressed to a third terminal station; and a second optical circuit that receives the first combined signal outputted from the first optical circuit, optically removes a portion of a spectrum of the first optical signal to generate a third optical signal, and transmits, without change, the second optical signal, thereby outputting the second optical signal and the third optical signal to the third terminal station;

wherein the second optical circuit is a wavelength selective switch (WSS) module configured to optically remove a portion of a spectrum of the first optical signal to generate the third optical signal, and transmit, without change, a spectrum of the second optical signal.

9. The node apparatus according to claim 8, further comprising:

a third optical circuit, wherein the first optical circuit comprises an optical coupler configured to branch the first combined signal received from the first terminal station into a first branched signal and a second branched signal and outputting the first branched signal and the second branched signal, wherein the first branched signal is inputted to the second optical circuit, and wherein the third optical circuit transmits only a fourth optical signal received from the third terminal station and addressed to the second terminal station, and the first optical signal included in the second branched signal to the second terminal station.

10. A communication system, wherein first to third terminal stations are connected to the node apparatus according to claim 9 through transmission paths.

11. A communication system, wherein first to third terminal stations are connected to the node apparatus according to claim 8 through transmission paths.

12. The communication system according to claim 11, wherein a removal amount of the spectrum of the first optical signal by the second optical circuit is determined in such a way that the third optical signal is difficult to be intercepted at the third terminal station and a reduced amount of power of the third optical signal due to the removal of the spectrum is within a predetermined range.

13. A node apparatus comprising:

a first optical circuit that outputs a first combined signal, the first combined signal comprising a first optical signal received from a first terminal station and addressed to a second terminal station, and a second optical signal received from the first terminal station and addressed to a third terminal station;

a second optical circuit that receives the first combined signal outputted from the first optical circuit, optically removes a portion of a spectrum of the first optical signal to generate a third optical signal, and transmits, without change, the second optical signal, thereby outputting the second optical signal and the third optical signal to the third terminal station; and a third optical circuit;

wherein the first optical circuit comprises a second optical coupler configured to branch the first combined signal received from the first terminal station into a first branched signal and a second branched signal and outputting the first branched signal and the second branched signal;

wherein the first branched signal is inputted to the second optical circuit;

wherein the third optical circuit transmits only a fourth optical signal received from the third terminal station and addressed to the second terminal station, and the first optical signal included in the second branched signal to the second terminal station;

wherein the first optical circuit further comprises:

a first wavelength filter for removing the second optical signal from the second branched signal, and outputting the first optical signal; and a second optical coupler for branching the first optical signal that was outputted from the first wavelength filter into two sub-branched signal and outputting the two sub-branched signals, and the second optical circuit comprises:

a second wavelength filter for removing the first optical signal from the first branched signal, and outputting the second optical signal;

a narrowband interleaver configured to divide the spectrum of the first optical signal into a plurality of wavelength bands and optically remove at least one wavelength band between each two adjacent wavelength bands, thereby outputting a signal having a discontinuous spectrum as the third optical signal; and a third optical coupler for combining the third optical signal and the second optical signal outputted from the second wavelength filter into a second combined signal, and transmitting the second combined signal to the third terminal station.

14. A communication system, wherein first to third terminal stations are connected to the node apparatus according to claim 13 through transmission paths.

15. A method of controlling a node apparatus, comprising:

outputting a first combined signal, the first combined signal comprising: a first optical signal received from a first terminal station and addressed to a second terminal station, and a second optical signal received from the first terminal station and addressed to a third terminal station;

splitting the first combined signal into the first optical signal and the second optical signal;

dividing a spectrum of the first optical signal into a plurality of wavelength bands and optically removing at least one wavelength band between each two adjacent wavelength bands, thereby generating a signal having a discontinuous spectrum as a third optical signal;

combining the second optical signal and the third optical signal into a second combined signal; and transmitting the second combined signal to the third terminal station.

* * * * *

UNITED STATES PATENT AND TRADEMARK OFFICE
CERTIFICATE OF CORRECTION

PATENT NO. : 10,288,826 B2  
APPLICATION NO. : 15/506504  
DATED : May 14, 2019  
INVENTOR(S) : Shohei Yamaguchi Page 1 of 1

It is certified that error appears in the above-identified patent and that said Letters Patent is hereby corrected as shown below:

In the Specification

Column 1, Title, Line 2; After "METHOD", insert --¶CROSS REFERENCE TO RELATED APPLICATIONS
This application is a National Stage of International Application No. PCT/JP2015/004142 filed Aug. 19, 2015, claiming priority based on Japanese Patent Application No. 2014-171530 filed Aug. 26, 2014, the contents of all of which are incorporated herein by reference in their entirety.--

In the Claims

Column 13, Line 26; In Claim 15, after "as", delete "¶"

Signed and Sealed this
Third Day of September, 2019

Andrei Iancu
*Director of the United States Patent and Trademark Office*